(12) United States Patent
Lindholm et al.

(10) Patent No.: US 9,851,106 B2
(45) Date of Patent: Dec. 26, 2017

(54) VALVE FOR A FUEL INJECTOR

(71) Applicant: Siemens Aktiengesellschaft, Munich (DE)

(72) Inventors: Annika Lindholm, Finspång (SE); Joachim Nordin, Linghem (SE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/125,475

(22) PCT Filed: Mar. 25, 2015

(86) PCT No.: PCT/EP2015/056410
§ 371 (c)(1),
(2) Date: Sep. 12, 2016

(87) PCT Pub. No.: WO2015/155007
PCT Pub. Date: Oct. 15, 2015

(65) Prior Publication Data
US 2017/0074516 A1    Mar. 16, 2017

(30) Foreign Application Priority Data
Apr. 7, 2014  (EP) ..................... 14163738

(51) Int. Cl.
*F16K 11/07* (2006.01)
*F23R 3/28* (2006.01)
(Continued)

(52) U.S. Cl.
CPC ................ *F23R 3/28* (2013.01); *F02C 7/232* (2013.01); *F16K 11/0655* (2013.01);
(Continued)

(58) Field of Classification Search
CPC .... F23R 3/28; F23K 5/14; F02C 7/232; F16K 11/07; F16K 31/1268; F05D 2260/96; F05D 2270/08; F05D 2270/14
See application file for complete search history.

(56) References Cited

U.S. PATENT DOCUMENTS

| | | | |
|---|---|---|---|
| 3,857,241 A | 12/1974 | Lewis | |
| 4,385,639 A * | 5/1983 | Holborow | ........... F16K 11/0655 137/106 |

(Continued)

FOREIGN PATENT DOCUMENTS

| | | |
|---|---|---|
| DE | 2914828 A1 | 10/1980 |
| EP | 2063087 A2 | 5/2009 |

(Continued)

OTHER PUBLICATIONS

International Search Report dated Sep. 24, 2015, for PCT application No. PCT/EP2015/056410.
(Continued)

*Primary Examiner* — Steven Sutherland
(74) *Attorney, Agent, or Firm* — Beusse Wolter Sanks & Maire

(57) ABSTRACT

A fuel injector for injecting fuel in a burner of a gas turbine where the fuel injector has a body with an inner hole and a valve element which is slideably arranged inside the inner hole. The body has a fuel inlet which is formed into the body for injecting fuel into the inner hole, wherein the fuel inlet is coupleable to a fuel supply line. The body further has a first outlet channel connected to the inner hole, wherein the first outlet channel is further coupleable to a burner. The valve element has a first passage which is formed such that in a first position of the valve element inside the inner hole, (Continued)

the first passage connects the fuel inlet with the first outlet channel and in a second position of the valve element inside the inner hole.

9 Claims, 2 Drawing Sheets

(51) Int. Cl.
*F02C 7/232* (2006.01)
*F23K 5/14* (2006.01)
*F16K 11/065* (2006.01)

(52) U.S. Cl.
CPC .............. *F16K 11/07* (2013.01); *F23K 5/147* (2013.01); *F05D 2260/96* (2013.01); *F05D 2270/08* (2013.01); *F05D 2270/14* (2013.01)

(56) References Cited

U.S. PATENT DOCUMENTS

| | | | | |
|---|---|---|---|---|
| 5,528,897 A * | 6/1996 | Halin | ...................... | F02C 7/232 60/39.094 |
| 2009/0320480 A1 * | 12/2009 | Scully | ..................... | F02C 7/228 60/734 |
| 2010/0037615 A1 * | 2/2010 | Williams | .............. | F16K 15/186 60/741 |
| 2012/0227842 A1 | 9/2012 | Griffiths et al. | | |

FOREIGN PATENT DOCUMENTS

| | | | | |
|---|---|---|---|---|
| EP | 2469057 A1 | 6/2012 | | |
| EP | 2497923 A2 | 9/2012 | | |
| FR | 2214362 A5 * | 8/1974 | .......... | F15B 13/0431 |
| GB | EP 2497923 A2 * | 9/2012 | .............. | F02C 7/228 |

OTHER PUBLICATIONS

EP Search Report dated Nov. 27, 2014, for EP application No. 14163738.9.

* cited by examiner

VALVE FOR A FUEL INJECTOR

CROSS REFERENCE TO RELATED APPLICATIONS

This application is the US National Stage of International Application No. PCT/EP2015/056410 filed Mar. 25, 2015, and claims the benefit thereof. The International Application claims the benefit of European Application No. EP14163738 filed Apr. 7, 2014. All of the applications are incorporated by reference herein in their entirety.

FIELD OF INVENTION

The present invention relates to a fuel injector for injecting fuel in a burner of the gas turbine, to a gas turbine and to a method of operating a fuel injector for injecting fuel in a burner of the gas turbine.

ART BACKGROUND

Gas turbines comprise several individual burners that may interfere with each other during operation. The interaction between the burners may prevent an efficient operation of the turbine and may lead to an increased emission, in particular to the increase of nitrogen oxides, an uneven flame temperature, oscillations and so forth.

The burners in the gas turbine receive fluid from a respective fuel injectors which usually includes an inlet and several outlets. This may lead to pressure difference over a length of the manifold and also at the position of the burners. Additionally, differences may occur due to tolerances introduced while manufacturing the fuel injectors and burners to the gas turbine.

The differences are equalized by altering the size of openings in the orifices. However, this adjustment or modification needs to be performed regularly and is a time consuming and expensive process. Furthermore, if the size of the openings are too big, a flashback into the burner section may occur due to increased flame temperature or an altered fuel profile.

SUMMARY OF THE INVENTION

It may be an objective of the present invention to provide a fuel injector for a burner of a gas turbine with a reduced risk of a flashback, with an optimised emission control and with a control of combustion dynamics.

This objective is solved by a fuel injector for injecting fuel in a burner of the gas turbine, by a gas turbine and by a method of operating a fuel injector for injecting fuel in a burner of the gas turbine according to the independent claims.

According to a first aspect of the present invention, a fuel injector for injecting fuel in a burner of a gas turbine is presented. The fuel injector comprises a body comprising an inner hole and a valve element which is slideably arranged inside the inner hole. The body comprises a fuel inlet which is formed into the body for injecting fuel into the inner hole, wherein the fuel inlet is coupleable to a fuel supply line. The body further comprises a first outlet channel connected to the inner hole, wherein the first outlet channel is further coupleable to a burner. The valve element comprises a first passage which is formed such that in a first position of the valve element inside the inner hole, the first passage connects the fuel inlet with the first outlet channel and in a second position of the valve element inside the inner hole, the valve element seals the fuel inlet from the first outlet channel.

According to a further aspect of the present invention, a gas turbine is presented. The gas turbine comprises a burner and a fuel injector as described above which is coupled to the burner for injecting fuel in the burner.

According to a further aspect of the present invention, a method for operating a fuel injector as described above for injecting fuel in a burner of a gas turbine. The method comprises a sliding of the valve element in the first position inside the inner hole such that the first passage connects the fuel inlet with the first outlet channel and sliding the valve element in a second position of the valve element inside the inner hole such that the valve element seals the fuel inlet from the first outlet channel.

A turbine comprises in general a compressor section for compressing air, a burner section for adding thermal energy to the compressed air and a turbine section for transferring the energy of the compressed air into mechanical energy.

The burner section may comprise one or a plurality of burners in which a fuel/air mixture is burnt and added to the compressed fluid. The burner section may comprise a plurality of can-type burners which are arranged one after another along a circumferential direction of the gas turbine or one ring-type burner which surrounds the gas turbine shaft, for example.

The fuel injector according to the present invention comprises a body with an inner hole and the respective valve element, such as a valve spool or a valve piston. The valve element is slidably along the sliding direction inside the fuel inlet. The position of the valve element inside the inner hole is controllable by the driving mechanism, for example by an actuator and a spindle element as described further below. The driving mechanism is controlled for example by a control unit which comprises the engine control unit (ECU), for example.

The fuel injector functions as a fuel valve for injecting fuel in the burner of the gas turbine. The fuel injector describes in the present application a device (i.e. a valve device) which is adapted and suitable for being connected to the burner in order to inject (in the sense of "delivering") fuel to the mentioned burner. The fuel injector as described in the present application may be connected to respective injector nozzles inside the burner. However, the fuel injector may be arranged outside of the burner and may be connected to respective injectors inside the burner by its outlet channel.

The valve element comprises for example a cylindrical shape comprising a circular, elliptical or rectangular surface area. The inner hole is formed with a respective cross-section, i.e. the cross-section of the inner hole is dependent on the shape and profile of the valve element.

The valve element comprises the first passage. The first passage may form a through hole through the valve element. Furthermore, the first passage may form a groove which is formed along the surface of the valve element. The first passage, and the through hole or groove, respectively, is formed such that in the first position the first passage connects the fuel inlet with the first outlet channel. The first passage generates a fluid connection and a fuel channel, respectively between the fuel inlet and the first fuel outlet.

If the valve element is slid in the second position, the valve element seals the fuel inlet from the first outlet channel. For example, the valve element is formed such that in the second position, the surface of the valve element closes the fuel inlet and/or the first outlet channel. Additionally, the valve element may comprise a respective edge or protrusion, respectively, which is formed such that the protrusion or edge closes the fuel inlet and/or the first outlet channel in the second position.

The first outlet channel is coupled to a burner of the gas turbine. If a flashback into the burner section is detected, hence, if fuel or a flame moves along an upstream direction from the burner into the first outlet channel in the direction to the valve element, the valve element simply moves along the sliding direction to the second position and a fluid connection between the fluid inlet and the first outlet channel is cut. Hence, turbulences and undesired pressure differences in the burner may as a consequence be regulated, such that the valve element may be slid again in the first position for re-establishing the fluid connection between the fuel inlet and the first outlet channel.

Dependent to the desired load of the gas turbine and hence the desired fuel profile within a respective burner, a respective amount of fuel has to be provided. If the amount of fuel varies with respect to a desired threshold value of fuel, undesired turbulences and hence pressure differences are caused. This may lead to a flashback of the flame into the burner section which may cause for example carbonization and a loss of efficiency.

According to a further exemplary embodiment of the present invention, the body comprises a second outlet channel connected to the inner hole, wherein the second outlet channel is further coupleable to the burner or a further burner. The valve element is slideable inside the inner hole along a sliding direction, wherein the first outlet channel is spaced apart from the second outlet channel along the sliding direction.

The second outlet channel may be connected to the fuel inlet via the first passage or a second passage, as described below. If the second outlet channel is coupled to the burner to which the first outlet channel is already coupled, the valve element may generate a fluid connection between the fuel inlet and the respective outlet channel as described below.

According to a further exemplary embodiment of the present invention, the first passage is formed such that—in the first position of the valve element inside the inner hole, the valve element seals the fuel inlet from the second outlet channel and—in the second position of the valve element inside the inner hole, the first passage connects the fuel inlet with the second outlet channel and seals the fuel inlet from the first outlet section.

Hence, for example a burner may be coupled to the first outlet channel and a further burner may be coupled to the second outlet channel, such that depending on the position of the valve element inside the inner hole, either the burner of the further burner is supplied with fuel from the fuel inlet. Alternatively, the first outlet channel and the second outlet channel may be coupled to a common burner. The first outlet channel and the second outlet channel may comprise a diameter (i.e. a hydraulic diameter) which differs with respect to each other. Hence, through the first outlet channel a first amount of fuel and through the second outlet channel and a second amount of fuel may stream into the common burner. Hence, in a first operating condition, the first amount of fuel flowing through the first outlet channel is injected into the burner end and a second operating condition, the second amount of fuel streams through the second outlet channel into the common burner.

According to a further exemplary embodiment of the present invention, the valve element comprises a second passage which is spaced apart from the first passage along the sliding direction. The second passage is formed such that—in the second position of the valve element inside the inner hole, the valve element seals the fuel inlet from the first outlet channel and from the second outlet channel and—in a third position of the valve element inside the inner hole the second passage connects the fuel inlet with the second outlet channel. In the third position, the valve element may seal the first passage, for example.

The distance of the first passage and the second passage along the sliding direction is defined in such a way that in the first position, the fuel flows from the fuel inlet to the first outlet channel via the first passage, in the second position, the valve element seals the fuel inlet from the first outlet channel and from the second outlet channel and in the third position, the fuel flows from the fuel inlet to the second outlet channel via the second passage, wherein a fluid flow between the fuel inlet and the first outlet channel is prevented.

According to a further exemplary embodiment of the present invention, the valve element comprises an inlet groove which is formed such that the fluid inlet is connected to the first passage and to the second passage. Hence, the inlet groove may form an inlet volume or a recess in which the fuel or the fuel/air mixture may be distributed before flowing through the respective passages. Hence, a more homogeneous flow through the respective passages is achievable.

According to a further exemplary embodiment of the present invention, the second passage is formed such that—in a fourth position of the valve element inside the inner hole, the second passage connects the fuel inlet with the first outlet channel and the second outlet channel.

Hence, in the fourth position, the maximum fuel flow is provided because both outlet channels are connected to the fuel inlet. Hence, by the present invention, instead of one large conventional outlet channel, a plurality of smaller sized outlet channels, which comprises smaller diameters and hydraulic diameters, respectively, with respect to the conventional outlet channel are formed without reducing the maximum amount of fuel flow flowing into the burner. Hence, a flashback of the flame and the fuel, respectively, may be reduced because of the smaller outlet channels according to the present invention.

According to a further exemplary embodiment of the present invention, the valve element comprises a first outlet groove which is coupled to the first passage, wherein the first outlet groove comprises a length along the sliding direction which length is smaller than a distance between the first outlet channel and the second outlet channel along the sliding direction such that in the first position of the valve element the first outlet groove connects the first passage with the first outlet channel and the fuel inlet is sealed from the second outlet channel by the valve element.

In particular, if the first outlet groove is shorter than the distance between the first outlet channel and the second outlet channel, the position of the valve element is definable, wherein only the first outlet groove forms a fluid connection with the first outlet channel in the first position of the valve element. Furthermore, the first outlet groove may comprise a tapering profile wherein a hydraulic diameter at an interface to the first passage is smaller than a hydraulic diameter at an interface to the first outlet channel. Hence, the first outlet groove forms a diffusor such that the flow characteristics of the fuel through the first passage and the first outlet groove, respectively, may be improved.

According to a further exemplary embodiment of the present invention, the valve element comprises a second outlet groove which is coupled to the second passage and which extends along the sliding direction. The second outlet groove comprises a length along the sliding direction which length is larger than a distance between the first outlet channel and the second outlet channel along the sliding direction such that in the fourth position of the valve element the second outlet groove connects the second passage with the outlet channel and the second outlet channel.

According to a further exemplary embodiment of the present invention, the fuel injector comprises a driving mechanism which is coupled to the valve element for driving the valve element within the inner hole.

According to a further exemplary embodiment of the present invention, the driving mechanism comprises an actuator and a spindle element. The spindle element is coupled to the body and to the valve element such that a pivoting of the spindle element generates a sliding motion of the valve element within the inner hole. The actuator is coupled to the spindle element such that a torque is transferable to the spindle element by the actuator for pivoting the spindle element.

According to a further exemplary embodiment, the actuator is arranged in a sealed chamber of the body. Between the sealed chamber and the inner hole, a fluid connection is prevented. Between the sealed chamber and inner hole, a separation wall is arranged. The separation wall may comprise a through hole which comprises a thread. The spindle may form a thread connection with the through hole of the separation wall, such that by pivoting the spindle element, the spindle element slides along the sliding direction. At a free end of the spindle, the valve element is fixed such that a sliding of the spindle element causes a respective sliding of the valve element along the sliding direction. At a further free end of the spindle, which is arranged at an opposite direction with respect to the above-mentioned free end, the actuator may be coupled. Hence, by the thread connection between the through hole of the separation wall and the spindle element, a sealing between the in inner hole and the spindle chamber is achieved.

The exemplary embodiments of the fuel injector described above comprise a first passage and the second passage in the valve element and the fuel inlet and a first and second outlet channel in the body, respectively. However, the scope of the present invention comprises also exemplary embodiments, wherein the fuel injector comprises a body with more than two further outlet channels and a valve element with more than two passages which may be coupled to the respective outlet channels if the valve element is located in a desired position within the inner hole. Additionally, also more than one fuel inlet maybe formed within the body of the fuel injector, wherein the further fuel inlets are connected with respective passages of the valve element.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
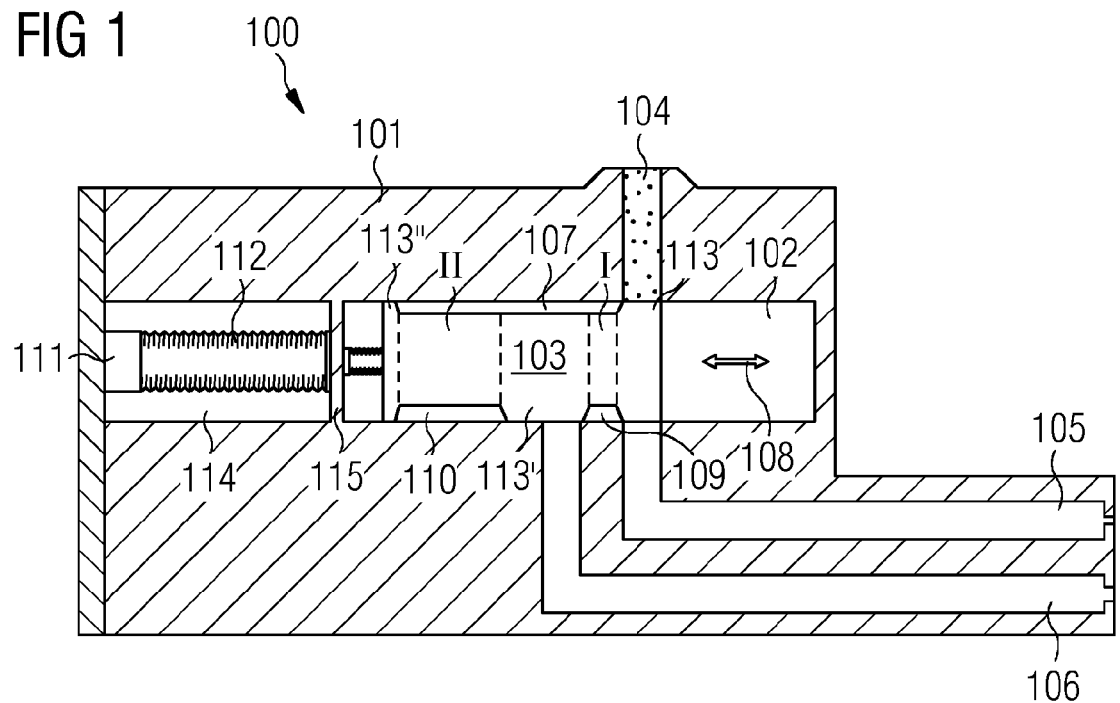
FIG. 1 shows a schematical view of a fuel injector according to an exemplary embodiment of the present invention, wherein a valve element is located in a second position within an inner hole.

The illustration in the drawings is in schematic form. It is noted that in different figures, similar or identical elements are provided with the same reference signs.

FIG. 1 to FIG. 4 show a schematical view of a fuel injector 100 according to an exemplary embodiment of the present invention. The fuel injector 100 comprises a body 101 comprising an inner hole 102 and a valve element 103 which is slideably arranged inside the inner hole 102. The body 101 comprises a fuel inlet 104 which is formed into the body 101 for injecting fuel into the inner hole 102, wherein the fuel inlet 104 is coupleable to a fuel supply line. The body 101 further comprises a first outlet channel 105 connected to the inner hole 102, wherein the first outlet channel 105 is further coupleable to a burner. The valve element 103 comprises a first passage I which is formed such that in a first position of the valve element 103 inside the inner hole 102, the first passage I connects the fuel inlet 104 with the first outlet channel 105 and in a second position of the valve element 103 inside the inner hole 102, the valve element 103 seals the fuel inlet 104 from the first outlet channel 105.

The fuel injector 100 according to the present invention comprises a body 101 with an inner hole 102 and the respective valve element 103, such as a valve spool or a valve piston. The valve element 103 is slidably along the sliding direction inside the fuel inlet 104. The position of the valve element 103 inside the inner hole 102 is controllable by a driving mechanism, for example by an actuator 111 and a spindle element 112 as described further below. The driving mechanism is controlled for example by a control unit which comprises the engine control unit (ECU), for example.

The valve element 103 comprises for example a cylindrical shape comprising a circular, elliptical or rectangular surface area. The inner hole 102 is formed with a respective cross-section, i.e. the cross-section of the inner hole 102 is dependent on the shape and profile of the valve element 103.

Figure 2:
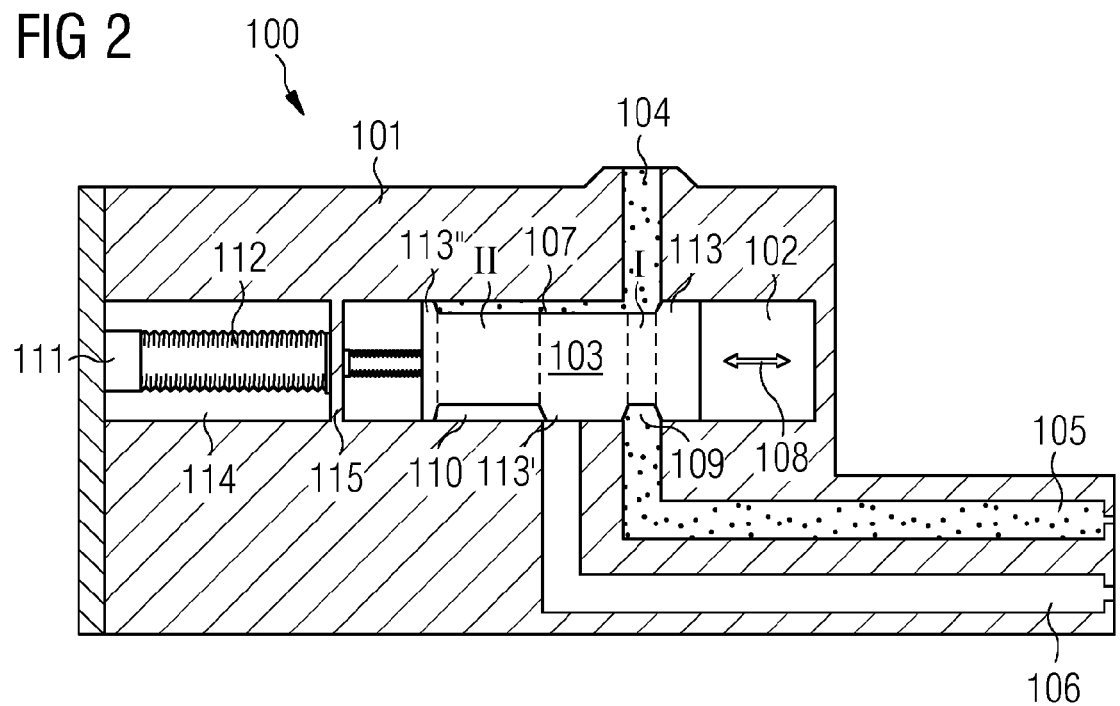
FIG. 2 shows a schematical view of a fuel injector according to an exemplary embodiment of the present invention, wherein a valve element is located in a first position within an inner hole.
Figure 3:
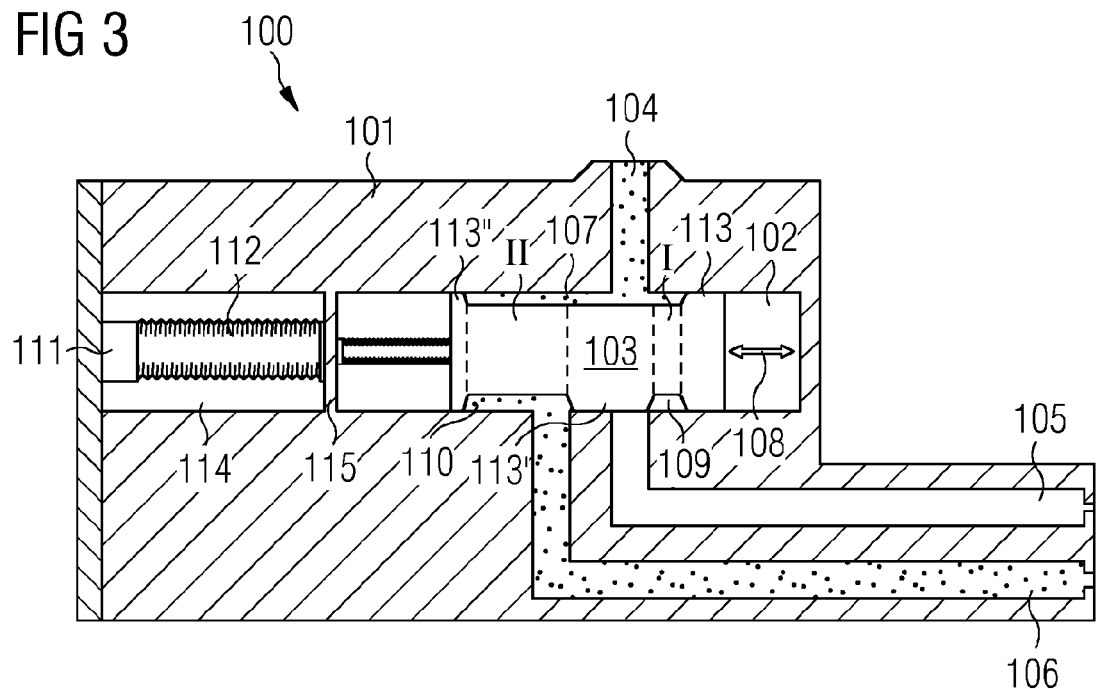
FIG. 3 shows a schematical view of a fuel injector according to an exemplary embodiment of the present invention, wherein a valve element is located in a third position within an inner hole.

The valve element 103 comprises a first passage I. The first passage I may form a through hole through the valve element 103. Alternatively, the first passage I may form a groove which is formed along the surface of the valve element. The first passage I is formed such that in the first position (as shown in FIG. 2) the first passage I connects the fuel inlet 104 with the first outlet channel 105.

If the valve element 103 is slid in the second position (as shown in FIG. 1), the valve element 103 seals the fuel inlet 104 from the first outlet channel 105. For example, the valve element 103 is formed such that in the second position, the surface of the valve element 103 closes the fuel inlet 104 and/or first outlet channel 105. Additionally, the valve element 103 may comprise a respective edge or protrusion 113, respectively, which is formed such that the edge or protrusion 113 closes the fuel inlet 104 and/or the first outlet channel 105 in the second position.

The first outlet channel 105 is coupled to a burner of the gas turbine. If a flashback into the burner section is detected, hence, if fuel or a flame moves along an upstream direction into the burner, the valve element 103 simply moves along the sliding direction 108 to the second position and a fluid connection between the fluid inlet 105 and the first outlet channel is cut. Hence, turbulences and undesired pressure differences in the burner may as a consequence be regulated, such that the valve element 103 may be slid again in the first position (see FIG. 1) for re-establishing the fluid connection between the fuel inlet 104 and the first outlet channel 105.

The body 101 further comprises a second outlet channel 106 connected to the inner hole 102, wherein the second outlet channel 106 is further coupleable to the burner or a further burner. The valve element 103 is slideable inside the inner hole 102 along the sliding direction 108, wherein the first outlet channel 105 is spaced apart from the second outlet channel 106 along the sliding direction 108.

The second outlet channel 106 connectable to the fuel inlet 104 via a second passage II. If the second outlet channel 106 is coupled to the burner to which the first outlet channel 105 is already coupled, the valve element 103 may generate a fluid connection between the fuel inlet 101 and the respective outlet channel 105, 106 as described below.

The valve element 103 further comprises a second passage II which is spaced apart from the first passage I along the sliding direction 108. The second passage II is formed such that in the second position (see FIG. 1) of the valve element 103 inside the inner hole 102, the valve element 103 seals the fuel inlet 102 from the first outlet channel 105 and from the second outlet channel 106 and in a third position (FIG. 3) of the valve element 103 inside the inner hole 102 the second passage II connects the fuel inlet 104 with the second outlet channel II. In the third position, the valve element seals the first passage I.

The distance of the first passage I and the second passage II along the sliding direction 108 is defined in such a way that in the first position I, the fuel flows from the fuel inlet 104 to the first outlet channel 105 via the first passage I and in the second position, the valve element 103 seals the fuel inlet 104 from the first outlet channel 105 and from the second outlet channel 106 and in the third position, the fuel flows from the fuel inlet 104 to the second outlet channel 106 via the second passage II, wherein a fluid flow between the fuel inlet 104 and the first outlet channel 105 is prevented.

As shown in FIG. 1 to FIG. 4, the valve element comprises an inlet groove 107 which is formed such that the fluid inlet 104 is connected to the first passage I and to the second passage II. Hence, the inlet groove 107 may form an inlet volume or a recess in which the fuel or the fuel/air mixture may be distributed before flowing through the respective passages I, II. Hence, a more homogeneous flow through the respective passages I, II is achievable.

Furthermore, the second passage II is formed such that in a fourth position (see FIG. 4) of the valve element 103 inside the inner hole 102, the second passage II connects the fuel inlet 104 with the first outlet channel 105 and the second outlet channel 106.

Hence, in the fourth position, the maximum fuel flow is provided because both outlet channels 105, 106 are connected to the fuel inlet 104. Hence, by the present invention, instead of one large conventional outlet channel, a plurality of smaller sized outlet channels 105, 106, which comprise smaller diameters and hydraulic diameters, respectively, with respect to the conventional outlet channel are formed without reducing the maximum amount of fuel flow flowing into the burner.

Furthermore, the valve element comprises a first outlet groove 109 which is coupled to the first passage I, wherein the first outlet groove 109 comprises a length along the sliding direction 108 which length is smaller than a distance between the first outlet channel 105 and the second outlet channel 106 along the sliding direction 108 such that in the first position of the valve element the first outlet groove 109 connects the first passage I with the first outlet channel 105 and the fuel inlet 104 is sealed from the second outlet channel 106 by the valve element 103.

In particular, if the first outlet groove 109 is shorter than the distance between the first outlet channel 105 and the second outlet channel 106, the position of the valve element 103 is definable, wherein only the first outlet groove 109 forms a fluid connection with the first outlet channel 105 in the first position of the valve element 103.

The valve element 103 comprises a second outlet groove 110 which is coupled to the second passage II and which extends along the sliding direction 108. The second outlet groove 110 comprises a length along the sliding direction 108 which length is larger than a distance between the first outlet channel 105 and the second outlet channel 106 along the sliding direction 108 such that in the fourth position of the valve element 103 the second outlet groove 110 connects the second passage II with the first outlet channel 105 and the second outlet channel 106.

Figure 4:
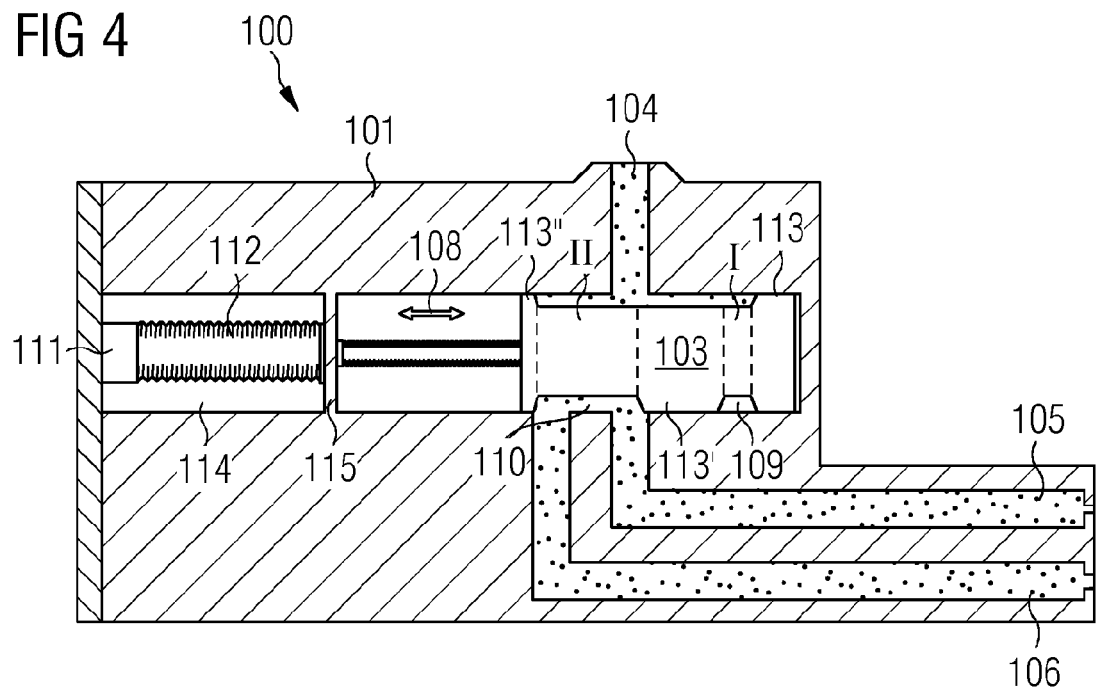
FIG. 4 shows a schematical view of a fuel injector according to an exemplary embodiment of the present invention, wherein a valve element is located in a fourth position within an inner hole.

Besides the fourth position as shown in FIG. 4, by the second outlet groove 110 as described above, also a fuel split ratio between the fuel flowing through the first and second outlet channel 105, 106 may be adjusted. For example, the second outlet groove 110 is formed such that if the valve element 103 is slid in a fifth position (e.g. the valve element 103 is slid more to the left side in comparison to the position shown in FIG. 4), the second outlet groove 110 still fully covers the second outlet channel 106 and the protrusion 113' only partially covers the first outlet channel 105.

Accordingly, the second outlet groove 110 is formed such that if the valve element 103 is slid in a sixth position (e.g. the valve element 103 is slid more to the right side in comparison to the position shown in FIG. 4), the second outlet groove 110 fully covers the first outlet channel 105 and the protrusion/edge 113" partially covers the second outlet channel 106.

Hence, by the exemplary embodiment described above in FIG. 1 to FIG. 4, a predefined fuel ratio between a mass flow of fuel through the first outlet channel 105 and a mass flow of fuel through the second outlet channel 106 is controllable. For example, the first outlet channel 105 is coupled to a main burner section of a burner for injecting the main fuel and the second outlet channel 106 is coupled to a pilot burner section of the burner for injecting the pilot fuel. Hence, by the fuel injector 100 according to the present invention, a main fuel/pilot fuel split is adjustable in an easy manner.

The fuel injector comprises a driving mechanism which is coupled to the valve element 103 for driving the valve element within the inner hole 102. The driving mechanism comprises an actuator 111 and a spindle element 112. The spindle element 112 is coupled to the body 101 and to the valve element 103 such that a pivoting of the spindle element 112 generates a sliding motion of the valve element 103 within the inner hole 102. The actuator 111 is coupled to the spindle element 112 such that a torque is transferable to the spindle element 112 by the actuator 111 for pivoting the spindle element 111.

The actuator 111 is arranged in a sealed chamber 114 of the body 101. Between the sealed chamber 114 and the inner hole 102, a fluid connection is prevented. Between the sealed chamber 114 and the inner hole 102, a separation wall 115 is arranged. The separation wall 115 comprises a through hole which comprises a thread. The spindle element 112 forms a thread connection with the through hole of the separation wall 115, such that by pivoting the spindle element 112, the spindle element 112 slides along the sliding direction 108. At a free end of the spindle element 112, the valve element 103 is fixed such that a sliding of the spindle element 112 causes a respective sliding of the valve element 103 along the sliding direction 108. At a further free end of the spindle element 112, which is arranged at an opposite direction with respect to the above mentioned free end, the actuator 111 is coupled. Hence, by the thread connection between the through hole of the separation wall 115 and the spindle element 112, a sealing between the in inner hole 101 and the sealing chamber 114 is achieved.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A fuel injector for injecting fuel in a burner of a gas turbine, the fuel injector comprising:
   a body comprising an inner hole,
   a valve element which is slideably arranged inside the inner hole,
   wherein the body comprises a fuel inlet which is formed into the body for injecting fuel into the inner hole,
   wherein the fuel inlet is coupleable to a fuel supply line,
   wherein the body comprises a first outlet channel connected to the inner hole,
   wherein the first outlet channel is further coupleable to the burner,
   wherein the valve element comprises a first passage which is formed such that
      in a first position of the valve element inside the inner hole, the first passage connects the fuel inlet with the first outlet channel, and
      in a second position of the valve element inside the inner hole, the valve element seals the fuel inlet from the first outlet channel,
   wherein the body comprises a second outlet channel connected to the inner hole,
   wherein the second outlet channel is further coupleable to the burner or a further burner,
   wherein the valve element is slideable inside the inner hole along a sliding direction,
   wherein the first outlet channel is spaced apart from the second outlet channel along the sliding direction,
   wherein the valve element comprises a second passage which is spaced apart from the first passage along the sliding direction,
   wherein the second passage is formed such that
      in the second position of the valve element inside the inner hole, the valve element seals the fuel inlet from the first outlet channel and from the second outlet channel, and
      in a third position of the valve element inside the inner hole the second passage connects the fuel inlet with the second outlet channel, wherein a fluid flow between the fuel inlet and the first outlet channel is prevented, and
   wherein the valve element comprises an inlet groove which is formed such that the fuel inlet is connected to the first passage and to the second passage.

2. The fuel injector according to claim 1, wherein the second passage is formed such that in a fourth position of the valve element inside the inner hole, the second passage connects the fuel inlet with the first outlet channel and the second outlet channel.

3. The fuel injector according to claim 2, wherein the valve element comprises a first outlet groove which is coupled to the first passage, wherein the first outlet groove comprises a length along the sliding direction which length is smaller than a distance between the first outlet channel and the second outlet channel along the sliding direction such that in the first position of the valve element the first outlet groove connects the first passage with the first outlet channel and the fuel inlet is sealed from the second outlet channel by the valve element.

4. The fuel injector according to claim 1, wherein the valve element comprises a second outlet groove which is coupled to the second passage and which extends along the sliding direction, and wherein the second outlet groove comprises a length along the sliding direction which length is larger than a distance between the first outlet channel and the second outlet channel along the sliding direction such that in a fourth position of the valve element the second outlet groove connects the second passage with the first outlet channel and the second outlet channel.

5. The fuel injector according to claim 1, further comprising a driving mechanism which is coupled to the valve element for driving the valve element within the inner hole.

6. The fuel injector according to claim 5, wherein the driving mechanism comprises an actuator and a spindle element, wherein the spindle element is coupled to the body and to the valve element such that a pivoting of the spindle element generates a sliding motion of the valve element within the inner hole, wherein the actuator is coupled to the spindle element such that a torque is transferable to the spindle element by the actuator for pivoting the spindle element.

7. The gas turbine, comprising the burner, and the fuel injector according to claim 1 which is coupled to the burner for injecting fuel in the burner.

8. A method for operating a fuel injector for injecting fuel in a burner of a gas turbine, wherein the fuel injector comprises
   a body comprising an inner hole and a valve element which is slideably arranged inside the inner hole,
   wherein the body comprises a fuel inlet which is formed into the body for injecting fuel into the inner hole,
   wherein the fuel inlet is coupleable to a fuel supply line,
   wherein the body comprises a first outlet channel connected to the inner hole, wherein the first outlet channel is further coupleable to the burner,
wherein the valve element comprises a first passage,
the method comprising:
sliding the valve element in a first position inside the inner hole such that the first passage connects the fuel inlet with the first outlet channel, and
sliding the valve element in a second position of the valve element inside the inner hole such that the valve element seals the fuel inlet from the first outlet channel,
wherein the body comprises a second outlet channel connected to the inner hole,
wherein the second outlet channel is further coupleable to the burner or a further burner,
wherein the valve element is slideable inside the inner hole along a sliding direction,
wherein the first outlet channel is spaced apart from the second outlet channel along the sliding direction,
wherein the valve element comprises a second passage which is spaced apart from the first passage along the sliding direction,
wherein the second passage is formed such that
in the second position of the valve element inside the inner hole, the valve element seals the fuel inlet from the first outlet channel and from the second outlet channel, and
in a third position of the valve element inside the inner hole the second passage connects the fuel inlet with the second outlet channel, wherein a fluid flow between the fuel inlet and the first outlet channel is prevented, and
wherein the valve element comprises an inlet groove which is formed such that the fuel inlet is connected to the first passage and to the second passage.

9. A fuel injector for injecting fuel in a burner of a gas turbine, the fuel injector comprising:
a body comprising an inner hole,
a valve element which is slideably arranged inside the inner hole,
wherein the body comprises a fuel inlet which is formed into the body for injecting fuel into the inner hole,
wherein the fuel inlet is coupleable to a fuel supply line,
wherein the body comprises a first outlet channel connected to the inner hole,
wherein the first outlet channel is further coupleable to the burner,
wherein the valve element comprises a first passage which is formed such that
in a first position of the valve element inside the inner hole, the first passage forms a fluid path that provides fluid communication between the fuel inlet and the first outlet channel, and
in a second position of the valve element inside the inner hole, the valve element blocks the fluid communication between the fuel inlet and the first outlet channel,
wherein the body comprises a second outlet channel connected to the inner hole,
wherein the second outlet channel is further coupleable to the burner or a further burner,
wherein the valve element is slideable inside the inner hole along a sliding direction,
wherein the first outlet channel is spaced apart from the second outlet channel along the sliding direction,
wherein the valve element comprises a second passage which is spaced apart from the first passage along the sliding direction,
wherein the second passage is formed such that
in the second position of the valve element inside the inner hole, the valve element blocks fluid communication between the fuel inlet and the second outlet channel, and
in a third position of the valve element inside the inner hole the second passage forms a fluid path that provides fluid communication between the fuel inlet and the second outlet channel, wherein the valve element blocks the fluid communication between the fuel inlet and the first outlet channel, and
wherein the valve element comprises an inlet groove which is formed such that the fuel inlet is connected to the first passage and to the second passage.

* * * * *